June 1, 1965

G. R. DIXON 3,186,163

BARREL DETENT

Filed Aug. 30, 1962

INVENTOR.
GLENN R. DIXON
BY Donald R. Motsko

ATTORNEY

United States Patent Office 3,186,163
Patented June 1, 1965

3,186,163
BARREL DETENT
Glenn R. Dixon, Hamden, Conn., assignor to Olin Mathieson Chemical Corporation, a corporation of Virginia
Filed Aug. 30, 1962, Ser. No. 220,480
5 Claims. (Cl. 60—26.1)

This invention relates to apparatus for providing resistance to the movement of a working piston in a barrel and for automatically releasing the piston at a predetermined and adjusted force.

The invention more specifically relates to a novel detent assembly for holding a work performing piston stationary until a predetermined force has been exerted against the piston and then automatically releasing the piston.

In a preferred embodiment of this invention a work performing piston is mounted in a barrel and adapted to drive a stud fastener or the like into a rigid structure. The work performing piston is actuated by a liquid propellant which is ignited by adiabatic compression. The combustion product of the propellant builds up a great force at one end of the piston which is locked in a fixed position by a novel detent assembly. As soon as the force created by the burning propellant reaches a predetermined magnitude, the detent assembly automatically releases the piston and it moves with great speed and force against the stud fastener to drive it into a rigid structure.

The principle employed and the structure disclosed in this invention, it should be clearly understood, is not limited in any way to driving stud fasteners since other obvious uses will be readily apparent to those skilled in the art.

This invention will now be described in detail with reference to the accompanying drawings in which.

Figure 1:
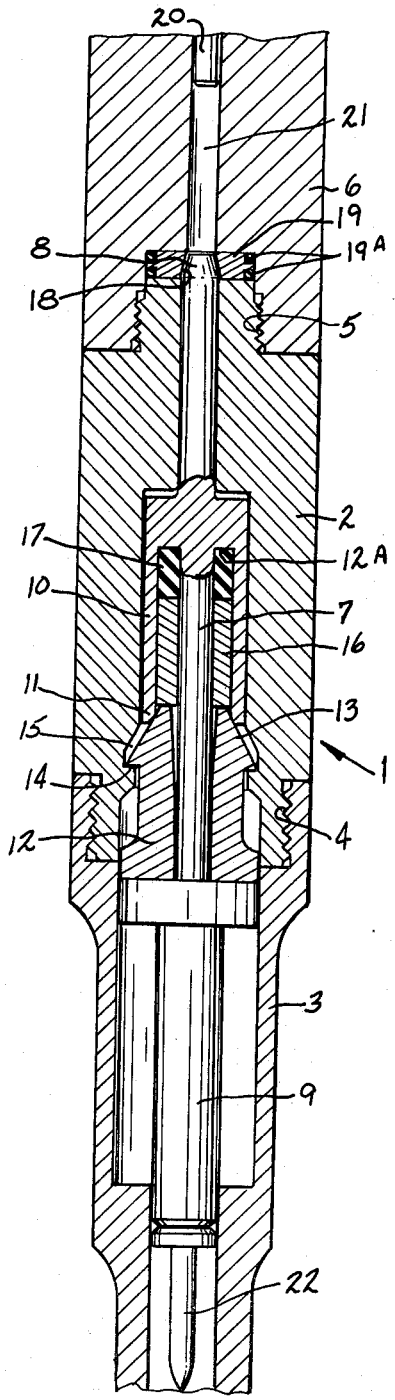
FIGURE 1 is a sectional side view showing the structural details of the device of this invention.

Referring now to FIGURE 1, there is shown a barrel generally indicated 1, having an upper portion 2 and a lower portion 3 screw threadedly joined at 4. The barrel 1 is in turn screw threadedly joined at 5 to the shank 6 of a tool of the type powered by adiabatic compression and ignition of a liquid propellant. A piston 7 is slidably mounted in the barrel 1 and includes a conical head portion 8 and a working head 9. Formed integral with the intermediate portion of the piston is a collet sleeve 10. The collet sleeve 10 is provided with an internally tapered lower cam edge 11. A collet 12 having a tapered head portion 13 is mounted in the barrel 1 generally below the collet sleeve 10. Collet 12 is a generally cylindrical element provided with a plurality of longitudinal slits extending from the upper margin into the side wall of the collet. The slits divide the upper portion of the collet into a plurality of resilient fingers. Each of the fingers is provided with a shoulder portion 14 adapted to engage an internal recess 15 formed in the barrel. The engagement of the shoulders 14 and recess 15 locks the piston 7 in a fixed position relative to barrel 1. The collet sleeve 10 is adapted to ride down over the tapered head portion 13 of the collet so that the shoulders 14 on the resilient fingers of the collet are cammed inwardly out of engagement with the annular recess 15 of the barrel. A spacer 16 is provided within the collet sleeve 10 between the upper portion of the collet 12 and a resilient element 17 which abuts the upper inside wall 12A of the collet sleeve. Spacer 16, it should be noted, can be formed as an integral portion of the collet 12. Resilient element 17 acts to impart an initial force to the conical head 8 of the piston so that it seals within the conical recess 18 of the sealing plate 19. A compression piston 20 is provided in the shank portion 6 which is adapted to compress a liquid propellant which has ben metered by means not shown into the combustion chamber 21 between the compression piston and the conical head 8. Adiabatic compression of the liquid propellant by the piston 20 causes the liquid propellant to ignite. The combustion of the liquid propellant produces a tremendous force on the conical head portion 8 of the piston. The force moves the piston 7 downwardly in the direction of the arrows and further compresses the resilient element 17. Relative movement occurs between the collet sleeve and the collet so that the cam edge 11 rides over the tapered head of the collet and cams the shoulders 14 inwardly out of engagement with the annular recess 15. The piston 7 is thus released and moves with great force in the direction of the arrows to drive a stud fastener 22 or the like into a rigid material.

The sealing plate 19 is sealed in its cavity by two O-rings 19A and is slightly smaller in diameter than the cavity to permit self-alignment with the conical piston head 8.

The operation of the device shown in FIG. 1 will now be described in detail.

FIG. 1 shows the working piston 7 in the latched position. It is prevented from movement in the direction of the arrows by the engagement of the shoulders 14 of the collet with the annular recess 15. The resilient element 17 applies an initial force and maintains the conical head 8 in intimate contact with the conical recess 18 in the sealing plate 19. The plate is sealed in its cavity by the O-rings 19A and is slightly smaller in diameter than the cavity to permit self-alignment with the conical head 8.

The compression piston 20 is moved in the direction of the arrows to compress a liquid propellant which has been metered in the combustion chamber 21 between the compression piston 20 and the conical head 8. During compression of the liquid propellant, the piston 7 is prevented from moving by the resilient elements 17 which is backed up by the collet 12. The piston 7 cannot move until sufficient force is applied to compress the resilient element 17. The combustion of the liquid propellant produces a sufficient force to compress the resilient elements 17 and permit the collet sleeve 10 to move against the tapered head portion 13 of the collet. This movement causes the resilient fingers with their shoulders 14 to move inwardly to disengage from the annular recess 15. The piston 7 is then free to move in the direction of the arrows. The piston moves with sufficient force to drive a stud fastener 22, which is positioned in the barrel into a rigid surface.

To return the piston 7 to the latched position, the thread 5 is backed off sufficiently to permit the shoulders 14 of the collet to be pressed into engagement with the annular recess 15 without compressing the resilient elements 17. The thread 5 is then tightened to force the contact between the conical head 8 and the conical recess of the sealing plate 19. This action partially compresses the resilient element 17 to a predetermined resistance.

The force at which the piston will be freed to travel is adjustable by varying the compressibility of the resilient element 17. It should be noted that the resilient elements 17 may be a piece of rubber, a spring, or other equivalent means.

Figure 2:
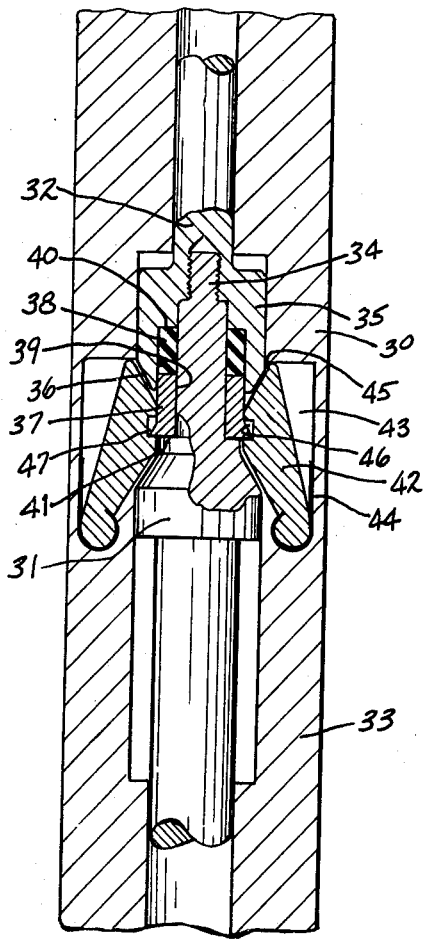
FIGURE 2 is a modified embodiment of the device shown in FIGURE 1.

The operation and function of the device shown in FIG. 2 is similar to the embodiment of FIG. 1; however, the detent means is arranged in a different manner.

In FIG. 2, the barrel 30 is provided with a working piston generally indicated 31. Piston 31 is composed of an upper portion 32 and a lower portion 33 which are screw threadedly joined at 34. The upper portion 32 has formed integral therewith a cam sleeve 35 having an inwardly tapered cam edge 36. A cylindrical collar 37 and a resilient element 38 are mounted in a hollow annular recess 39 in piston 31. The recess 39 is bounded by an upper shoulder 40 and a lower shoulder 41. Resilient element 38 is interposed in recess 39 between upper shoulder 40 and the collar 37. The resilient element functions in the same manner as resilient element 17 in FIG. 1. A plurality of latch fingers 42 are pivotally mounted in a recess 43 in the barrel 30. The latch fingers 42 are biased inwardly by spring members 44. Each latch finger is provided with a tapered upper edge 45 adapted to contact the cam edge 36 of cam sleeve 35. Each latch finger is further provided with a recess 46 adapted to engage a flared edge 47 integral with collar 37. The engagement of latch fingers 42 with the collar 37 locks piston 31 in a fixed position relative to barrel 30. When a sufficient force is applied to piston 31, the resilient element 38 is compressed and the cam sleeve 35 moves downwardly so that cam edge 36 moves fingers 42 out of engagement with the collar 37.

This invention has been described in detail with reference to the specific embodiments illustrated in the accompanying drawings. It is understood, however, that various modifications and design changes are anticipated which will be within the scope of the appended claims.

What is claimed is:

1. A detent assembly for automatically releasing a working piston at a predetermined force comprising, a housing, a working piston slidable in said housing from a latched position to a work performing position, cam means fixed to the piston, detent means operative to engage the housing and the piston to lock the piston in said latched position, resilient means disposed in series with the detent means and the piston operative to permit limited relative movement between the piston and the detent means when a predetermined pressure is applied to said piston, said limited relative movement being effective to permit said cam means to operate the detent to unlatch the piston whereby the piston is free to move to said work performing piston.

2. The device of claim 1 in which said detent means comprises a plurality of latch fingers pivotally mounted in said housing and a cylindrical collar having a flared edge surrounding a portion of said piston, each of said latch fingers being provided with a tapered upper edge to engage said cam means and a recess to engage said flared edge.

3. The device of claim 1 in which said detent means comprises a collet mounted in said housing adjacent said cam means, said collet having a plurality of resilient fingers each of which is provided with a shoulder adapted to engage in a recess in said housing, said cam means being operative to cam said resilient fingers inwardly out of engagement with said recess to release said working piston.

4. A working piston and detent assembly for use in a tool powered by the adiabatic compression and ignition of a liquid propellant comprising, a housing, a working piston slidably mounted in said housing, said working piston having a conical sealing head at one end normally abutting and sealing the lower end of a combustion chamber and a working head at the opposite end, a cylindrical cam sleeve open at its lower end connected to the intermediate portion of said working piston, a collet mounted in said housing having a conical head portion abutting said cam sleeve, shoulder means on said collet adapted to engage an annular recess in said housing to lock said working piston in a fixed portion, resilient means mounted in said housing between said piston and said collet resisting relative movement between the piston and the collet and urging said sealing head into sealing engagement with said combustion chamber, said resilient means being operative to yield and permit limited relative movement between the piston and the collet when a predetermined force is applied to said conical sealing head, said limited movement being effective to allow said cam sleeve to move the shoulder means of said collet out of engagement with said annular recess and free said piston.

5. A piston tool comprising a housing, a working piston slidably mounted in said housing, cam means fixed to the piston, detent means operative to engage the housing and the piston through a resilient member to lock the piston in a first position corresponding to a firing position, said resilient member being disposed in series with the detent and the piston and effective to permit limited relative movement between the piston and the detent when a predetermined pressure is applied to said piston, said limited relative movement being effective to permit said cam means to operate the detent to unlock the piston whereby the piston is free to move to a work performing position.

References Cited by the Examiner

UNITED STATES PATENTS

| | | | |
|---|---|---|---|
| 1,466,968 | 9/23 | Smith | 60—26.1 |
| 1,824,457 | 9/31 | Barlow | 60—26.11 |
| 2,221,121 | 11/41 | Wallace. | |
| 2,259,815 | 10/41 | Greve. | |
| 2,434,828 | 1/48 | Ashton. | |
| 2,768,610 | 10/56 | Lieser | 92—24 |
| 2,771,060 | 11/56 | Allbright. | |
| 2,946,313 | 7/60 | Powers. | |

FOREIGN PATENTS

| | | |
|---|---|---|
| 896,839 | 5/44 | France. |
| 362,577 | 8/38 | Italy. |

SAMUEL LEVINE, *Primary Examiner.*